United States Patent [19]

Sidlinger

[11] 4,215,894
[45] Aug. 5, 1980

[54] DEMOUNTABLE ASSEMBLY FOR ATTACHING A CAMPER BODY AND LOAD CARRIER TO A PICKUP BODY

[76] Inventor: Bruce C. Sidlinger, P.O. Box 40002, Garland, Tex. 75040

[21] Appl. No.: 872,996

[22] Filed: Jan. 27, 1978

[51] Int. Cl.² ............................................. B60P 3/00
[52] U.S. Cl. ...................................... 296/3; 135/3 A; 224/321
[58] Field of Search ...................... 296/3, 10, 100, 102, 296/104, 105; 135/1 A, 3 A, 5 A; 224/29 R

[56] References Cited

U.S. PATENT DOCUMENTS

| | | | |
|---|---|---|---|
| 2,670,988 | 3/1954 | Cook | 296/105 |
| 2,824,764 | 2/1958 | Stirling | 296/105 |
| 3,231,305 | 1/1966 | Beckman | 296/100 |
| 3,765,713 | 10/1973 | Suitt | 296/3 |
| 3,874,721 | 4/1975 | Tuggle | 296/105 |
| 3,888,538 | 6/1975 | McWilliams | 296/3 |

*Primary Examiner*—John J. Love
*Assistant Examiner*—John A. Carroll
*Attorney, Agent, or Firm*—Fisher, Christen & Sabol

[57] ABSTRACT

An assembly of demountable elements, each of which can be handled by one person, can be combined to convert a pickup truck body into either a camper or to provide a ladder, or boat, carrier or both. The assembly rests in the stake sockets of the truck body and can also be attached, or removed, as a unit.

16 Claims, 8 Drawing Figures

DEMOUNTABLE ASSEMBLY FOR ATTACHING A CAMPER BODY AND LOAD CARRIER TO A PICKUP BODY

BACKGROUND OF THE INVENTION

This invention relates to accessories for vehicles, and more particularly to an assembly of elements which makes it possible to convert the usual type of motor vehicle pickup truck into either a so-called "camper" having a fabric top or to make it possible to equip the pickup body with a ladder, or boat, carrier, and additionally to arrange the latter assembly to support an elongated object above the camper top if both assemblies are used.

In U.S. Pat. No. 2,670,988 to Cook there is shown a tubular framework which is supported by the front and back stake sockets of a pickup truck to support a fabric camper top. The transverse bows which support the top are slidable fore-and-aft, but they cannot be disassembled from the side rails and the entire framework and it would require at least two people to install and remove it from a vehicle body. Furthermore, there is no provision for carrying a boat, or other elongated body, above the camper top.

U.S. Pat. No. 2,824,764 to Stirling discloses an arrangement which permits the canopy supporting bows to slide along a pair of rails which fit into the stake sockets of a pickup, but these rails are slotted on their upper surfaces, which allows for the entry of debris which could jam the movement of the bows. There is also no provision for a truck rack to be combined with the canopy.

U.S. Pat. No. 3,765,713 to Suitt discloses a rack which supports elongated objects above the bed of a pickup truck but it does not utilize the stake sockets and includes no provision for supporting a canopy, or top.

U.S. Pat. No. 2,997,330 to Boultinghouse shows a pair of longitudinally hinged covers permanently attached to a pickup truck body which can be opened up to vertical positions to provide a carrying rack. However, the present extensive use of gooseneck type trailers which require a supporting mounting in the bed of the towing pickup would make these hinged covers impractical.

SUMMARY OF THE INVENTION

Therefore, it is an object of the present invention to provide an accessory which enables a single person to easily, and quickly install a camper top, or a utility rack, or both on the usual pickup truck bed, and to remove these accessories when desired.

These objects are accomplished by providing a pair of elongated rails each of which is dropped into place in the stake sockets disposed along the respective sides of the usual pickup truck body. The rails are provided with smooth upper surfaces which are circular in cross-section to receive a pair of open sleeves attached to the lower ends of a series of fabric supporting bows. The sleeves, however, loosely encircle a sufficient circumferential area of each rail to prevent significant tilting of the bows while, at the same time permitting them to be placed in position on the rails from one end while the rails are in place, or to be removed therefrom.

Another object of the invention is to provide the rails with an arrangement of horizontal transverse openings, or sockets, which are designed to removably receive the inwardly turned lower extremities of the downwardly extending legs of one, or more, transverse load carrying horizontal racks which are thus positioned above the floor of the truck bed at a height sufficient to permit the installation at the same time of the bow supported camper top. The construction of the racks is such that they may be installed, or removed, by a single person by inserting the legs at one side of a rack into their sockets in one rail and then by outwardly springing the legs at the other side inserting the latter into their respective supporting sockets.

Other objects and advantages will be apparent to those skilled in the art after reading the following specification in connection with the annexed drawings, in which:

Figure 1:
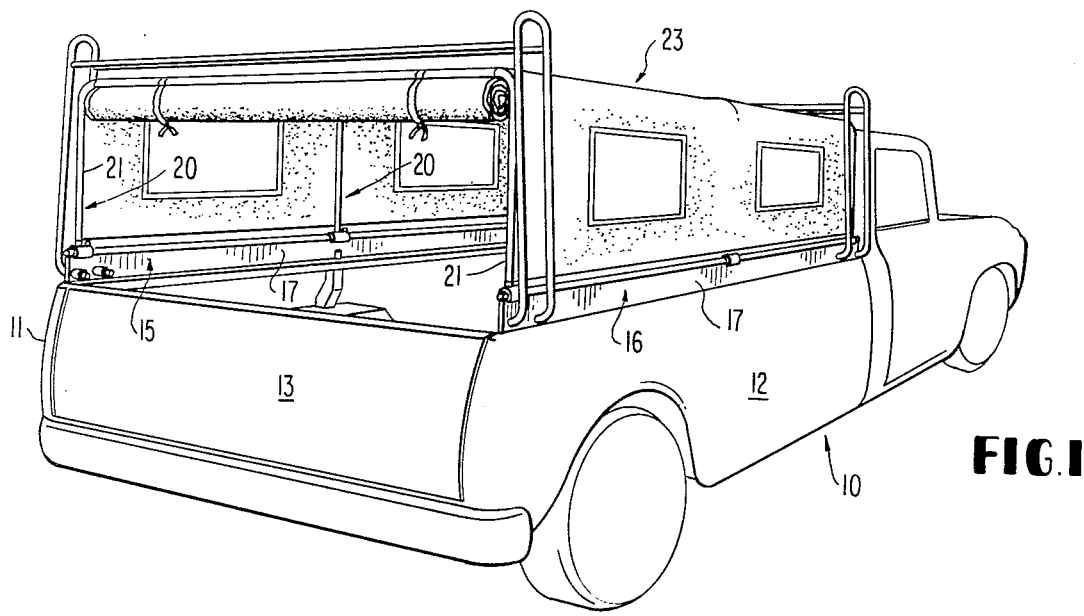
FIG. 1 is a perspective view of a preferred form of the invention in which both the camper top and two load carrying racks are shown in position on a typical light pickup truck.

In the drawings numeral 10 indicated generally a typical mobile pickup truck having an open flat bed body with vertical side walls 11 and 12 and a horizontally hinged tailgate 13. Each of the side walls is provided with at least two vertically extending stake sockets 14, one at each end with additional intermediate ones; in the present case three are shown in each side wall. These sockets are provided to provide support for a variety of upward extending auxiliary side walls or, in some cases a series of stakes designed to confine a load which projects above the level of the normally low side walls of the body.

A feature of the present invention is the provision of a pair of rails 15 and 16 which may be considered as serving as the primary supporting means for the remaining elements of the accessory. These rails consist of an elongated vertical web 17, to which is attached a series of downwardly extending spokes 18 which are removably received in the sockets 14 to firmly support the rails in place. While it is only necessary to provide the spokes at the ends of the rails, it is preferable to provide a spoke for each available socket and, if the sockets are symmetrically arranged, the two rails may be identical in contruction. The web 17 is surmounted along its entire length by a smooth load bearing surface 19. In the form shown, the surface 19 is circular in cross-section but it should be understood that other configurations, such as oval, rectangular or polygonal, could be employed.

Figure 2:
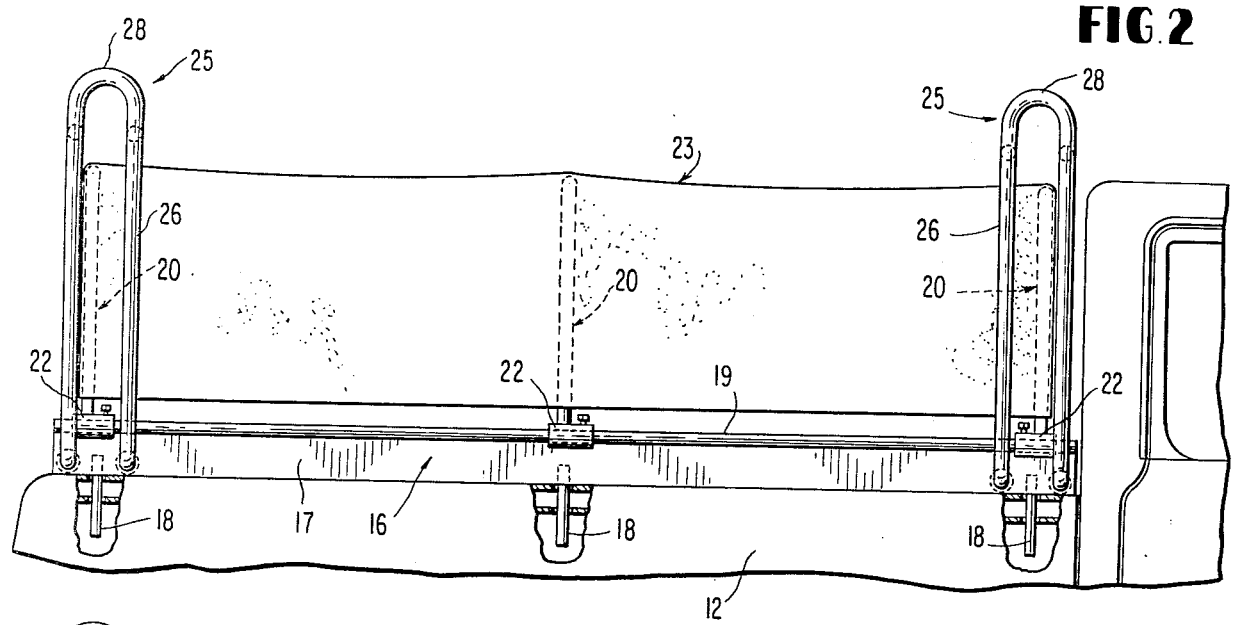
FIG. 2 is a partial side elevation of the pickup truck of FIG. 1, with portions of the body cut away to show the locations of the stake sockets.
Figure 3:
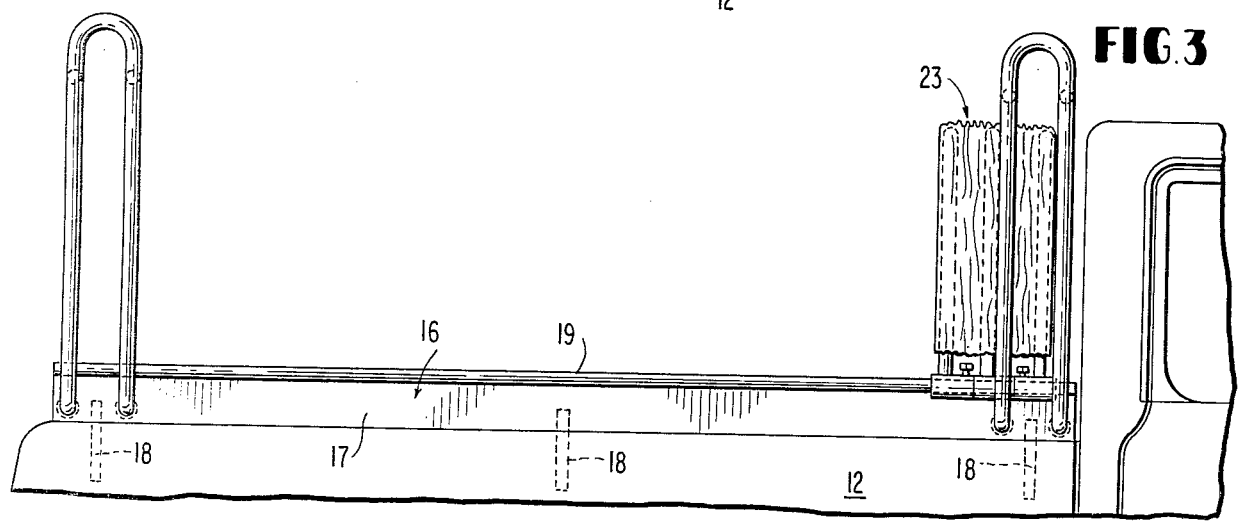
FIG. 3 is similar to FIG. 2 but with the bows for the fabric top slid to the forward positions with the top collapsed.
Figure 4:
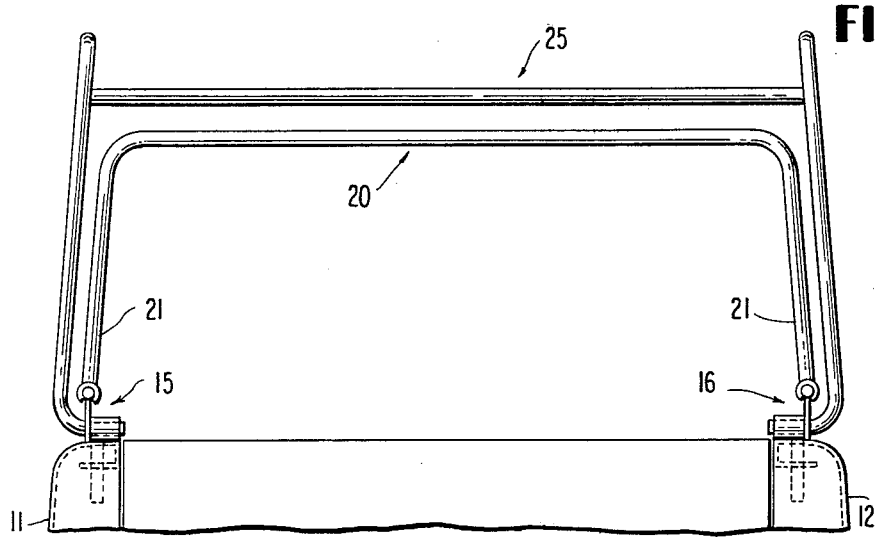
FIG. 4 is a rear elevation showing the rails, bows and racks in place.
Figure 7A:
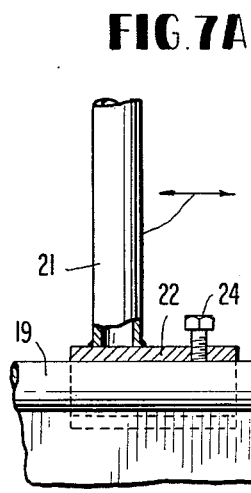
FIG. 7A is a detailed vertical cross-section of one of the sleeves which supports the bows on the rails.
Figure 7B:
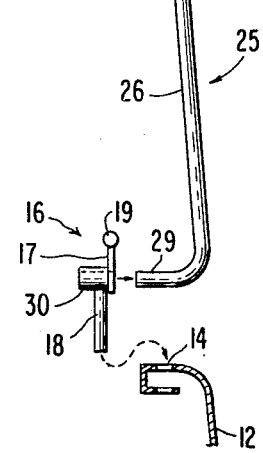
FIG. 7B is similar to FIG. 7A but wherein a tensioning means has been tightened to slightly tilt the bow to apply stress on the fabric cover to make it taut.
Figure 6:
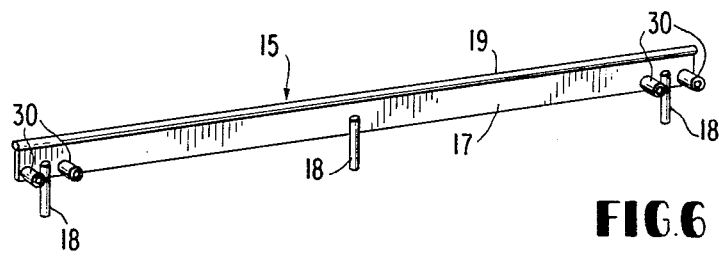
FIG. 6 is a perspective view of one of the rails.

One function of the rails 15 and 16 is to serve as a primary support for a series of canopy supporting bows, indicated generally by numeral 20, each of which may be formed of metal tubing in the shape of an inverted U with the legs 21 being provided at their lower ends with split sleeves 22 which loosely encircle the upper portions of the load bearing surfaces 19. Obviously, the inner cross-sectional configuration of the sleeves should preferably mate with the configuration of the rails and it is essential that the sleeves should extend downwardly over the surface 19 a sufficient amount to enable the sleeves to firmly support the bows in their upright positions while allowing them to be easily slid along the rails from the positions, as shown in FIGS. 1 and 2 for supporting a canopy, or top, indicated generally by numeral 23, made of fabric or plastic sheet material, to a storage position shown in FIG. 3 at one end of the rails. It should also be observed that the load bearing surfaces 19 extend in a straight line and that there are no obstructions to prevent complete removal of the bows at either end of the rails. In the usual case, the bows are light enough so that one person can install or remove them. As can be seen in FIGS. 7A and 7B, the sleeves 22 may be provided with means for firmly clamping them in place, such as a threaded bolt 24 inserted into an appropriately threaded opening in a sleeve.

By spacing the bolt away from the leg 21, and by arranging the endmost bows on the rails 19 in such a way that the bolts 24 are disposed on the inner sides of the legs of these bows, as shown in FIG. 2, it is possible to apply tension in a fore-and-aft direction on the material of the canopy to keep it taut and avoid sagging. This is done by first pushing the endmost bows against the respective inner end walls of the canopy before the bolt 24 is tightened. In that position, tightening of the bolts, as in FIG. 7B will cause each of the bows to tilt slightly in an outward direction against the end surfaces of the enclosing top.

Another function of the rails 15 and 16 is to support one or more transverse load-carrying racks, indicated generally by numeral 25. Each rack may comprise a pair of vertical legs 26 which preferably consist of a tubular member bent in the shape of an inverted narrow U. The legs are joined to each other by another pair of horizontal tubular member 27 which are welded, or otherwise joined, to the legs a slight distance below their upper extremities, so that the upwardly projecting apex 28 of each leg serves as a protective guard to prevent a ladder, or boat, or other object from sliding sideways off of the horizontal support 27.

Figure 5:
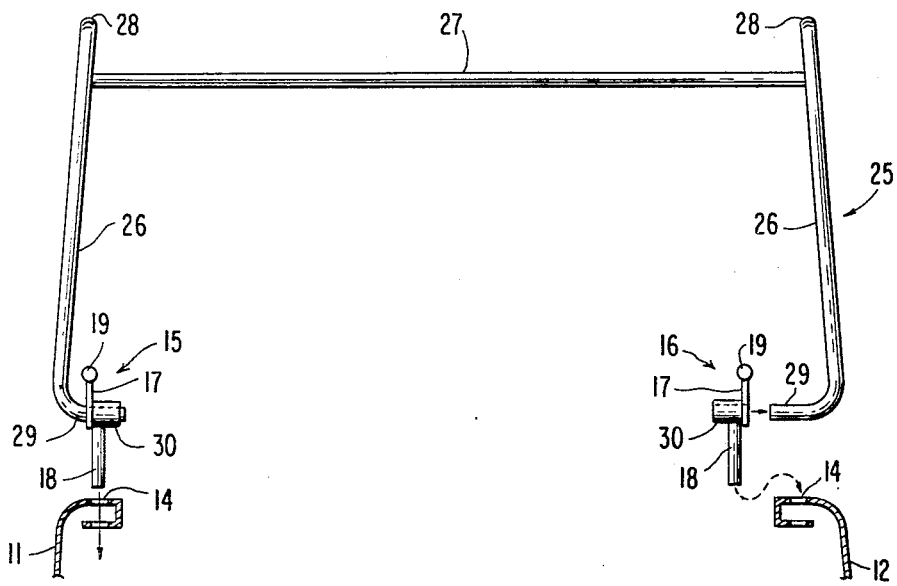
FIG. 5 is a rear elevation showing the rails and a rack separated from the truck body.

The two lower extremities 29 of each tube forming the legs 26 are turned inwardly in a horizontal direction as can be seen in FIG. 5, and suitable openings are provided in the web 17 of each of the rails to receive the extremities 29. In addition, short sleeves 30 may be welded to the webs to assist in stabilizing the legs 26.

The normal dimensions of the racks 25 is such that when they are in place the legs 26 will be spaced outwardly from the sides of any canopy supported by the bows 20 and the horizontal tubing 27 will be positioned at a height which will be substantially above the exterior level of the top of the canopy. Thus, it is immaterial whether the camper top is being used when it is desired to carry a boat, or other elongated article in conjunction with the top.

As in the case of the bows 20, each of the load-carrying racks 25 may be constructed of tubular material which are light enough to be easily handled by one person. Similarly, a single person can easily install a rack by first inserting the inwardly turned portions 29 into a set of sleeves 30 provided in either rail 15, or 16, after which it will be possible to insert the opposite corresponding extremities 29 into the appropriate sleeves on the other rail by grasping the lower ends of the tubing 26 on the remaining side of the rack and springing them outwardly a sufficient distance to clear the exterior of the other rail while lowering them into position to allow the ends 29 to enter the sleeves 30 when the legs are released.

While the present invention makes it possible for one person to assemble all of the several elements to complete either combination to convert a pickup truck body into a camper, or elevated load carrier, or both, and the disassemble the combination, none of the advantages of a unitary assembly have been eliminated. When it is desired to use the truck both for its primary purpose as a load carrier while alternating frequently as a camper, the entire camper assembly can be removed by an appropriate hoist, or with sufficient manpower, by lifting the rails 15 and 16 upwardly to remove the spokes 18 from the stake sockets without disassembling any of the bows 20 or racks 25. Conversely, the camper or load carrying arrangement, when assembled on rails 15 and 16 can be placed on the truck body as a unit by reversing the previously mentioned procedure.

I claim:

1. In an accessory for a vehicle having a rectangular body provided with at least two pairs of vertical stake sockets located on the respective opposite sides thereof, the combination including a pair of primary support means, secondary support means and tertiary support means, each of said pair of primary support means being elongated to be removably mounted in a pair of said stake sockets along a respective opposite side of the body, said primary support means being provided with two separate independent mounting means to alternatively demountably receive said secondary and tertiary support means, said secondary support means being configured to support a canopy top, said tertiary support means comprising at least one horizontal rack transverse to the pair of primary support means for supporting an elongated object above said body, said secondary and tertiary support means being independently connectable with the respective separate independent mounting means for independent mounting and demounting from the primary support means while in place in said stake sockets.

2. Accessory as claimed in claim 1, wherein said secondary support means includes at least two upright bows extending transversely between said pair of primary support means.

3. Accessory as claimed in claim 2, wherein said independent mounting means includes means for sliding said bows along the length of said primary support means while maintaining the bows in their upright positions.

4. Accessory as claimed in claim 3, wherein each of said primary support means includes a smooth surfaced rail extending along the length thereof, and said bows are provided with a short split sleeve to encircle each of said rails to enable said bows to be slidable along said rails and to hold the bows upright.

5. Accessory as claimed in claim 4, wherein the sleeves of one of said bows loosely encircles the respective rails, and clamping means is provided to lock said sleeves in a selected position.

6. Accessory as claimed in claim 5, wherein said clamping means comprises an element threadedly mounted in one end of a sleeve to exert downward locking pressure on the top of a rail to tilt a bow in one direction to apply stress in a horizontal direction on a canopy top supported by the bow.

7. Accessory as claimed in claim 1, wherein said tertiary support means includes a horizontal portion which when the tertiary support means is in position is elevated above said body, said tertiary support means including upwardly projecting guard elements to limit the transverse shifting of said elongated object.

8. Accessory as claimed in claim 7, wherein said horizontal portion is supported by a pair of transversely spaced vertical portions, said independent mounting means including at least one horizontal opening provided in each of the elongated primary support means, said vertical portions terminating in horizontal sections, said tertiary support means being yieldable enough to permit the insertion of said terminating sections into the horizontal openings.

9. Accessory as claimed in claim 8, wherein each of said vertical portions includes a pair of members in generally parallel fore-and-aft spaced relation, each of said members being provided with horizontal terminal sections to be inserted into mating openings in the primary support means to prevent fore-and-aft tilting of the tertiary support means.

10. Accessory as claimed in claim 9, wherein said pair of members and an upwardly projecting guard comprises a generally inverted U-shaped continuous length of tubular metal.

11. In a demountable transverse load-carrying rack means for a pickup truck having a rectangular body provided with a pair of side members, the combination including a horizontal supporting element provided with a pair of downwardly extending legs, the respective side members of the body being provided with horizontally outwardly directed coupling means for the lower ends of said legs, each of said legs being provided with elements to be removably attached to the coupling means, the supporting element and legs comprising an integral unit of sufficient springiness to allow at least one of the lower ends of the legs to be temporarily horizontally displaced with respect to the other leg for connection with and disconnection from one of said coupling means, said coupling means including means to prevent rocking of the rack means when in place.

12. A load-carrying rack means as defined in claim 11, wherein said side members also include means to support a separable camper cover thereon, the top of said camper cover being disposed below the level of the horizontal supporting element of the rack.

13. A load-carrying rack means as defined in claim 11, wherein the lower end of at least one of said legs terminates in a centrally directed horizontal projection, and said coupling means includes an opening in one of the side members to receive said projection.

14. A load-carrying rack means as defined in claim 11, wherein the lower end of one of said legs is provided with two portions detachably engageable with a coupling means on a side member, said two portions being spaced from each other to prevent tilting of the rack assembly.

15. A load-carrying rack means as defined in claim 11, wherein said pair of side members are provided with means to detachably support a second load-carrying rack assembly similar to the first-mentioned rack assembly, and are also provided with means to detachably support a plurality of transverse bows extending between the side members and within the space defined by said rack assemblies.

16. A load-carrying rack means as defined in claim 15, wherein said means to detachably support said bows includes means for slidibly moving the bows in a fore-and-aft direction with respect to the rectangular body.

* * * * *